(12) United States Patent
Anders et al.

(10) Patent No.: US 9,746,027 B2
(45) Date of Patent: Aug. 29, 2017

(54) AUXILIARY BEARING OF THE BALL BEARING TYPE FOR A MAGNETICALLY SUSPENDED ROTOR SYSTEM

(71) Applicants: Jens Anders, Yvetot (FR); Mohamed Bendaoud, Fontaine-Heudebourg (FR); Joaquim Da Silva, Sennely (FR); Matthieu Oliva, Vernon (FR); Frederic Ponson, Luynes (FR)

(72) Inventors: Jens Anders, Yvetot (FR); Mohamed Bendaoud, Fontaine-Heudebourg (FR); Joaquim Da Silva, Sennely (FR); Matthieu Oliva, Vernon (FR); Frederic Ponson, Luynes (FR)

(73) Assignee: SKF MAGNETIC MECHATRONICS, Rue des Champs, Saint-Marcel (FR)

( * ) Notice: Subject to any disclaimer, the term of this patent is extended or adjusted under 35 U.S.C. 154(b) by 340 days.

(21) Appl. No.: 14/444,114

(22) Filed: Jul. 28, 2014

(65) Prior Publication Data
US 2015/0028706 A1   Jan. 29, 2015

(30) Foreign Application Priority Data
Jul. 26, 2013 (EP) .................................... 13306087

(51) Int. Cl.
*F16C 32/04* (2006.01)
*F16C 35/07* (2006.01)
(Continued)

(52) U.S. Cl.
CPC ........ *F16C 32/0402* (2013.01); *F16C 19/542* (2013.01); *F16C 27/04* (2013.01);
(Continued)

(58) Field of Classification Search
CPC ...... F16C 39/02; F16C 32/00; F16C 32/0442; F16C 19/00; F16C 19/10; F16C 19/49;
(Continued)

(56) References Cited

U.S. PATENT DOCUMENTS

| 845,778 A | * | 3/1907 | Hachfield | ............. F16C 19/182 |
| | | | | 384/544 |
| 1,325,113 A | * | 12/1919 | Rohn | .................... F16C 19/182 |
| | | | | 384/512 |

(Continued)

FOREIGN PATENT DOCUMENTS

| DE | 10136240 A1 | 2/2003 |
| DE | 10201107510 A1 | 11/2012 |
| JP | S63190930 A | 8/1988 |
| JP | H05288218 A | 11/1993 |

*Primary Examiner* — Tran Nguyen
(74) *Attorney, Agent, or Firm* — Bryan Peckjian; SKF USA Inc. Patent Dept.

(57) ABSTRACT

An assembly includes a rotating shaft supported with respect to a stationary housing by at least one active magnetic bearing presenting a mean radial air gap and at least one auxiliary bearing having first and second coaxially arranged annular surfaces is provided. One of the first and second coaxially arranged annular surfaces defines a clearance (E2) with one of the stationary housing and the rotating shaft, the clearance (E2) being less than the mean radial air gap and the other of the first and second coaxially arranged annular surfaces being integral with the other one of the stationary housing and the rotating shaft. The auxiliary bearing provides a first ball bearing and a second ball bearing having a misalignment with respect to each other in order to increase the starting torque.

8 Claims, 4 Drawing Sheets

(51) Int. Cl.
*F16C 39/02* (2006.01)
*F16C 19/54* (2006.01)
*F16C 35/073* (2006.01)
*F16C 27/04* (2006.01)
*F16C 19/16* (2006.01)

(52) U.S. Cl.
CPC ........ *F16C 32/048* (2013.01); *F16C 32/0442* (2013.01); *F16C 35/073* (2013.01); *F16C 39/02* (2013.01); *F16C 19/163* (2013.01); *F16C 2240/40* (2013.01); *F16C 2240/46* (2013.01)

(58) Field of Classification Search
CPC .... F16C 32/0402; F16C 35/073; F16C 27/04; F16C 32/048; F16C 33/66; F16C 29/058; F04D 29/058
USPC .............................................. 310/90; 384/535
See application file for complete search history.

(56) References Cited

U.S. PATENT DOCUMENTS

| | | | | |
|---|---|---|---|---|
| 2,019,464 | A * | 10/1935 | Riblet | F16C 19/182 384/571 |
| 4,824,264 | A * | 4/1989 | Hoebel | F16C 19/386 384/473 |
| 7,217,039 | B2 | 5/2007 | Baudelocque et al. | |
| 7,467,933 | B2 * | 12/2008 | Ni | F01C 17/06 384/609 |
| 2006/0153483 | A1 * | 7/2006 | Bridges | F01D 25/16 384/475 |
| 2009/0067768 | A1 * | 3/2009 | Ueno | F01D 25/16 384/512 |
| 2010/0098365 | A1 * | 4/2010 | Im | B60B 27/0005 384/512 |
| 2010/0247015 | A1 * | 9/2010 | Montagu | F01D 25/16 384/494 |

* cited by examiner

AUXILIARY BEARING OF THE BALL BEARING TYPE FOR A MAGNETICALLY SUSPENDED ROTOR SYSTEM

CROSS-REFERENCE TO RELATED APPLICATIONS

This application claims priority to European Patent Application No. 13306087 filed Jul. 26, 2013, the contents of which are herein fully incorporated by reference.

FIELD OF THE INVENTION

The present invention relates to an auxiliary bearing of the ball-bearing type for a magnetically suspended rotor system and to a magnetic suspension incorporating such auxiliary bearing.

DESCRIPTION OF THE RELATED ART

Magnetic bearings operate without mechanical friction, but require continuous supply of electrical power. In case of a power failure, the shaft needs to be supported by a so-called auxiliary bearing, which is also called landing bearing, emergency bearing or back-up bearing.

Thus rotary machines equipped with active magnetic bearings include mechanical auxiliary bearings which act if one of the magnetic bearings is overloaded or if the electrical or electronic control circuit fails or else in the event of stoppage or of suspension overload.

An auxiliary device provides mechanical redundancy and needs to be defined and dimensioned correctly so as to fully guarantee that the machine will not be damaged and that the equipment can recover immediately once the overload or servo-control failure has disappeared.

Rolling element bearings which are generally dry-lubricated or sleeve-bushing combinations (smooth rings) can be used for constituting auxiliary bearings. However auxiliary plain bearings having smooth surfaces, in particular auxiliary bearings using sleeve-bushing combinations have various drawbacks. In particular sleeves have typically insufficient load carrying capacity and cannot handle high sliding speeds. Therefore for applications such as "oil and gas" the auxiliary bearings are generally of the ball-bearing type.

Thus the weight and load of the rotor of a rotating machine may be supported by active magnetic bearings (AMB) thanks to magnetic fields. The active magnetic bearings are equipped with auxiliary bearings which have to support the rotor during a waiting phase of the machine and also should be able to catch the rotor in case of failure of the active magnetic bearing.

An auxiliary bearing consists of a high precision mechanical bearing which is "softly" preloaded in axial and radial directions.

A typical design of landing bearing arrangement is a set of angular ball bearings or deep groove ball bearings mounted in pair and which may be axially preloaded to increase the torque.

FIG. 6 shows an example of a conventional auxiliary bearing 18 of the ball-bearing type comprising a pair of rolling elements 3, 13, each set of rolling elements 3, 13 being between a stator cage 1, 11 and a rotor cage 2, 12. The rotor cage 2, 12 is integral with a rotor member 4 rotating around an axis X-X' 6, whereas a clearance is defined between the stator cage 1, 11 and a stationary stator member 5. The clearance may be for example between 0.2 and 0.3 millimeter and is smaller than the air gap of the associated radial magnetic bearing (not shown), which may be for example between 0.4 and 0.6 millimeter. Usually the clearance of the auxiliary bearing is about half the air gap of the magnetic bearing.

An example of an emergency bearing of the ball-bearing type is disclosed in U.S. Pat. No. 7,217,039 B2.

FIG. 7 shows an example of a vertical support 10 of a rotating machine comprising at least one active magnetic bearing 17, a position sensor 16 and an auxiliary bearing 18 which may be as disclosed here-above in connection with FIG. 6. The rotating machine may be for example a compressor. Two radial magnetic bearings 17 may be located on each side of the central portion of the compressor. Two auxiliary bearings 18 may be located in the vicinity of the ends of the compressor. In the known embodiment of FIG. 7, the clearance between the auxiliary bearing and the rest of the machine is identified by the reference numeral 20 and is located between the rotor cage 2, 12 and the rotor 4, whilst the stator cage 1, 11 is integral with the stationary stator member 5. However, the clearance could be located between the stator cage 1, 11 and the stationary stator member 5, and the rotor cage 2, 12 could then be integral with the rotor 4, as shown in FIG. 6.

While the rotor 4 is levitated in the active magnetic bearings, the aero torque generated by the high speed rotation of the rotor combined with the cooling flow from the process gas of the machine incorporating the magnetic bearings and auxiliary bearings may tend to force in rotation the inner rings of the ball bearings, if the ball bearing resistive torque is too low, thus leading to uncontrolled and unexpected rotation of the ball bearings. This phenomenon may generate accelerated wear of balls that could derive in reducing the preload of the bearing set.

Auxiliary bearings of the prior art are very often full complement bearings with no cage design, but they can also accommodate a cage. The auxiliary bearings are generally open bearings with no seals and no shield and they are grease lubricated. The main parameter used to adjust the starting torque of the bearing arrangement is the axial preload spring. However it is not sufficient to increase significantly the starting torque. No solution but adding landing seals are obvious solutions to increase the torque. However contacting seals would be generating a variation in torque over time due to wear of contacting lip.

SUMMARY OF THE INVENTION

The technical problem to be solved is therefore to remedy the above-mentioned drawbacks and in particular to increase significantly and in a controlled manner the starting torque of a set of ball bearings assembled in a cartridge used for the purpose of securing the landing of the rotor for a machine levitated on active magnetic bearings during failure of an associated magnetic bearing or when a shaft supported by an associated magnetic bearing is brought to rest.

The invention further aims at allowing the possibility of efficiently using an auxiliary bearing of the ball bearing type even if a shaft is rotated at a very high rotating speed and placed in severe conditions, for example with a cooling flow of a process gas.

The invention is defined in the appended claims.

The invention more specifically relates to an assembly comprising a rotating shaft supported with respect to a stationary housing by at least one active magnetic bearing presenting an air gap and at least one auxiliary bearing comprising first and second coaxially arranged annular surfaces, one of the first and second coaxially arranged annular surfaces defining a clearance (E2) with one of the stationary housing and the rotating shaft, the clearance (E2) being less than the air gap, and the other of the first and second coaxially arranged annular surfaces being integral with the other one of the stationary housing and the rotating shaft, characterized in that the auxiliary bearing comprises a first ball bearing and a second ball bearing having a misalignment with respect to each other.

The misalignment may be a radial misalignment or an angular misalignment.

Alternatively the misalignment may be both a radial misalignment and an angular misalignment.

The radial misalignment is preferably broader than the clearance (E2).

The angular misalignment may be preferably comprised between 5 and 30 degrees.

According to a specific embodiment the misalignment is obtained exclusively by a geometrical offset between the first and second ball bearings.

According to another embodiment the misalignment is obtained at least partly by application of a differential load on the first and second ball bearings.

The misalignment may be obtained by application of a load through axial or radial springs having different stiffnesses or different preloading conditions.

The misalignment may further be obtained through application of a non-uniform circumferential axial preload on the first and second ball bearings.

According to still another embodiment, the misalignment is obtained at least partly by the insertion of a first and a second annular wavy radial spring washers between the other of the first and second coaxially arranged annular surfaces of the first and second ball bearings respectively and the other one of the stationary housing and the rotating shaft, the first annular wavy spring washer having a different stiffness from the second annular wavy spring washer.

In addition the first and second annular wavy spring washers may further each have different stiffnesses around circumferences of the respective first and second ball bearings.

Typically the air gap is preferably between 0.2 and 0.5 mm and the clearance (E2) is preferably between 0.15 and 0.3 mm.

The invention further relates to a radial magnetic bearing device comprising an assembly as defined here-above.

DESCRIPTION OF THE PREFERRED EMBODIMENTS

The present invention will be described in connection with preferred embodiments which are given by way of examples.

Figure 1:
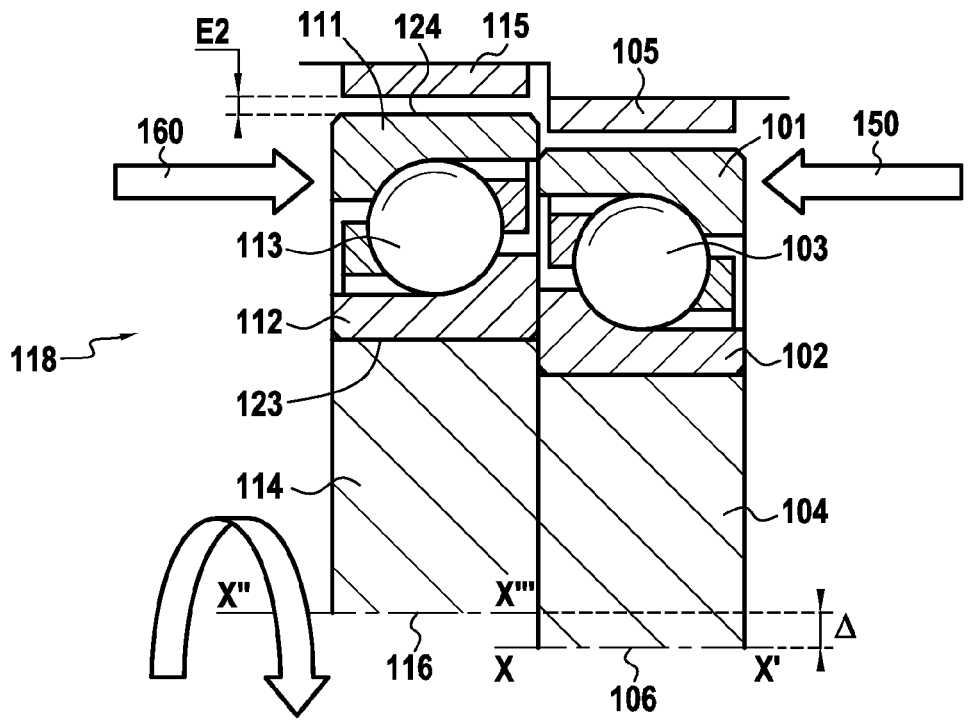
FIG. 1 is an axial half-section view of an auxiliary bearing of the ball bearing type according to a first embodiment of the invention, wherein a radial misalignment is created between two juxtaposed ball bearings of the auxiliary bearing.
Figure 7:
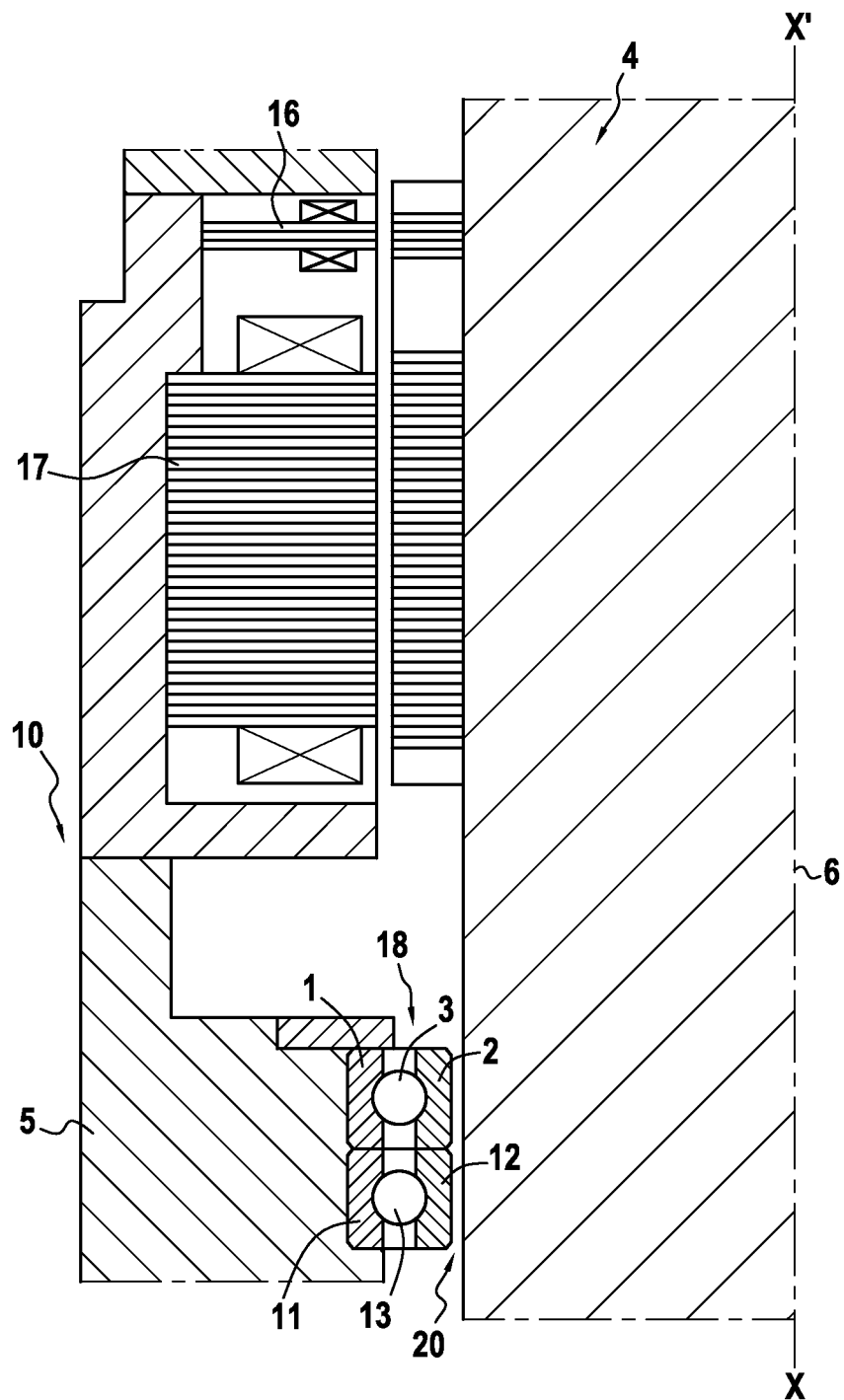
FIG. 7 is a schematic half-section view of a rotating machine having an active magnetic bearing with an auxiliary bearing according to the prior art.

FIG. 1 shows an example of a portion of an auxiliary bearing of the ball bearing type according to a first example of the invention. Such auxiliary bearing may be used with a conventional active radial magnetic bearing as defined in connection with FIG. 7.

FIG. 1 shows an example of an auxiliary bearing 118 of the ball-bearing type comprising a pair of rolling elements 103, 113, each set of rolling elements 103, 113 being between a stator cage 101, 111 and a rotor cage 102, 112. In this embodiment the rotor cage 102, 112 is integral with a rotor member 104, 114 rotating around an axis X-X' 106 or X"-X'" 116 respectively, whereas a clearance E2 is defined between the stator cage 101, 111 and a stationary stator member 105, 115 respectively. The clearance E2 may be for example between 0.2 and 0.3 millimeter and is smaller than the air gap of the associated radial magnetic bearing (not shown), which may be for example between 0.4 and 0.6 millimeter. Usually the clearance of the auxiliary bearing is about half the air gap of the magnetic bearing. It may be noted that in the embodiment of FIG. 1, the clearance E2 is defined between an annular surface 124 constituted by the outer surface of the stator cage 101, 111 and the stationary stator member 105, 115, whereas the annular surface 123 constituted by the outer surface of the rotor cage 102, 112 is integral with the rotating shaft 104, 114. However, the invention similarly applies to an embodiment where the clearance E2 is defined between an annular surface 123 constituted by the outer surface of the rotor cage 102, 112 and the rotating shaft 104, 114, whereas the annular surface 124 constituted by the outer surface of the stator cage 101, 111 is integral with the stationary stator member 105, 115.

According to the invention, an offset is created between the first and second ball bearings constituting the auxiliary bearing 118. The assembly of FIG. 1 is thus constructed in such a way that a radial misalignment Δ is voluntarily created between the axis X-X' 106 and the axis X"-X'" 116 and more generally between the first ball bearing comprising rolling elements 103 and the second ball bearing comprising rolling elements 113.

In the embodiment of FIG. 1, the radial misalignment Δ is generated mainly by geometrical means, i.e. there is an offset in the bearing housing seats of the first and second ball bearings. However the offset and radial misalignment may be further created by applying (in the direction of arrows 150 and 160) specific loads which are different for both ball bearings. These loads may be generated for example by radial or axial springs having different stiffnesses or having different preloading conditions.

Figure 2:
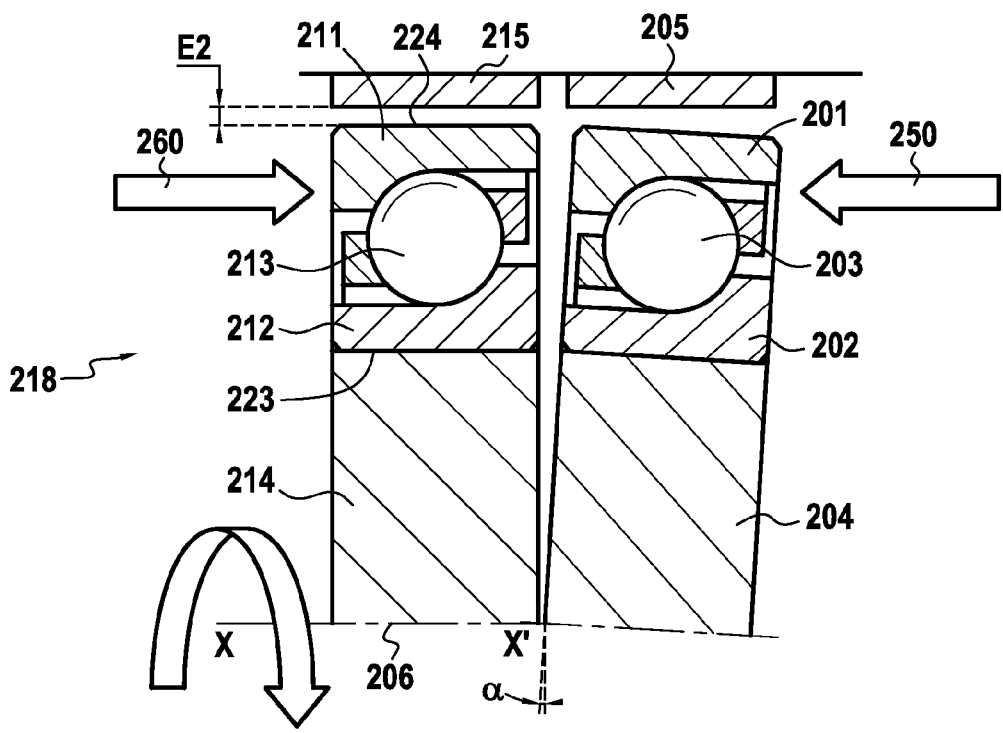
FIG. 2 is an axial half-section view of an auxiliary bearing of the ball bearing type according to a second embodiment of the invention, wherein an angular radial misalignment is created between two juxtaposed ball bearings of the auxiliary bearing.

FIG. 2 shows an example of a portion of an auxiliary bearing of the ball bearing type according to a second example of the invention. Such auxiliary bearing may be used with a conventional active radial magnetic bearing as defined in connection with FIG. 7.

FIG. 2 shows an example of an auxiliary bearing 218 of the ball-bearing type comprising a pair of rolling elements 203, 213, each set of rolling elements 203, 213 being between a stator cage 201, 211 and a rotor cage 202, 212. The rotor cage 202, 212 is integral with a rotor member 204, 214 rotating around an axis X-X' 206, whereas a clearance E2 is defined between the stator cage 201, 211 and a stationary stator member 205, 215 respectively. The clearance E2 may be for example between 0.2 and 0.3 millimeter and is smaller than the air gap of the associated radial magnetic bearing (not shown), which may be for example between 0.4 and 0.6 millimeter. Usually the clearance of the auxiliary bearing is about half the air gap of the magnetic bearing.

It may be noted that in the embodiment of FIG. 2, the clearance E2 is defined between an annular surface 224 constituted by the outer surface of the stator cage 201, 211 and the stationary stator member 205, 215, whereas the annular surface 223 constituted by the outer surface of the rotor cage 202, 212 is integral with the rotating shaft 204, 214. However, the invention similarly applies to an embodiment where the clearance E2 is defined between an annular surface 223 constituted by the outer surface of the rotor cage 202, 212 and the rotating shaft 204, 214, whereas the annular surface 224 constituted by the outer surface of the stator cage 201, 211 is integral with the stationary stator member 205, 215.

According to the invention, an offset is created between the first and second ball bearings constituting the auxiliary bearing 218. The assembly of FIG. 2 is thus constructed in such a way that an angular misalignment α is voluntarily created between the first ball bearing comprising rolling elements 103 and the second ball bearing comprising rolling elements 113.

In the embodiment of FIG. 2, the angular misalignment α is generated mainly by geometrical means, i.e. there is an offset in the bearing housing seats of the first and second ball bearings. For example as shown in FIG. 2, the second ball bearing with rolling elements 213 is mounted substantially perpendicularly to the axis X-X' 206, whereas the first ball bearing with rolling elements 203 is inclined by an angle α. Typically the angle α may be comprised between about 5 and 30 degrees, but other values are possible according to the needs.

The offset and angular misalignment may be further created by applying (in the direction of arrows 250 and 260) specific loads which are different for both ball bearings. These loads may be generated for example by radial or axial springs having different stiffnesses or having different preloading conditions.

In the same auxiliary bearing it is also possible to combine a radial misalignment Δ as shown in FIG. 1 and an angular misalignment α as shown in FIG. 2.

Some additional means may be used to generate an offset between two ball bearings used in the same auxiliary bearing.

Thus a non-uniform circumferential axial preload may be applied on each ball bearing in the direction of the arrows 150, 160 of FIG. 1 or in the direction of the arrows 250, 260 of FIG. 2.

The circumference variation of axial preload will induce a variation of the angular contact between the balls 103, 113; 203, 213 and the corresponding races. When the shaft is rotating, in one revolution thanks to the angular contact variation, the balls 103, 113; 203, 213 will accelerate and decelerate, thus producing a "traffic jam effect" which will increase significantly the ball bearing resistive torque.

It may be noted that due to the soft way of applying axial and radial preload on the ball bearings, a geometrical offset may be obtained as defined here-above with respect to FIGS. 1 and 2.

For example the bolting torque of each of a plurality of spring shims located around the circumference of the first and second ball bearings may be chosen to be non-uniform and therefore it is possible to purposely generate an offset in axial loading.

Figure 3:
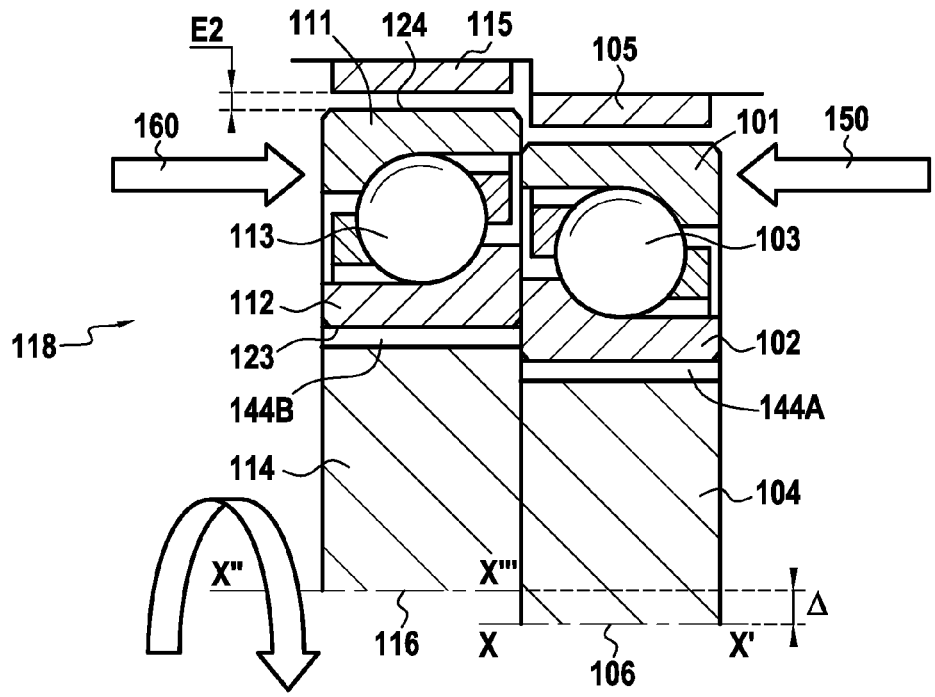
FIG. 3 is an axial half-section view of an auxiliary bearing of the ball bearing type according to a third embodiment of the invention, wherein a radial misalignment is created between two juxtaposed ball bearings of the auxiliary bearing and annular radial wavy spring washers cooperate with the ball bearings of the auxiliary bearing, FIGS. 4 and 5 respectively are a top view and a side view of an example of a wavy spring washer which may be used to constitute the annular radial wavy spring washers.

FIG. 3 illustrates another example of additional means used to create an offset in the ball bearings of an auxiliary bearing. The embodiment of FIG. 3 is substantially similar to the embodiment of FIG. 1 and the same elements have the same reference numerals and will not be described again.

Figure 4:
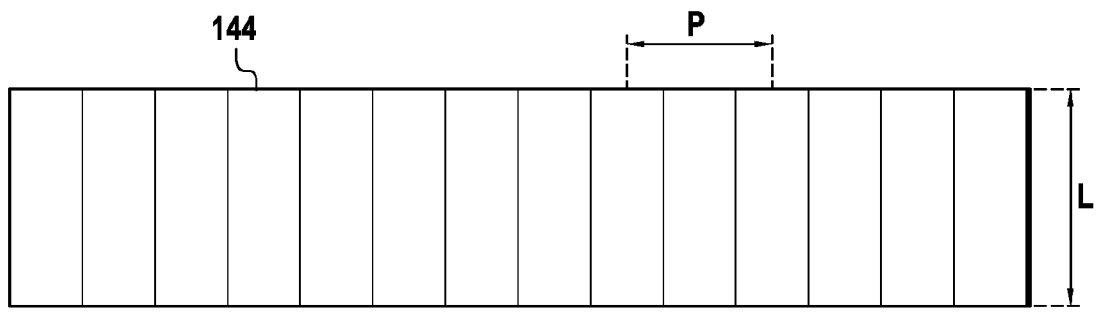
Figure 5:
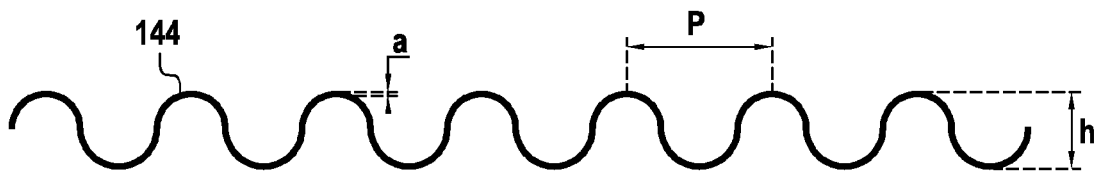
Figure 6:
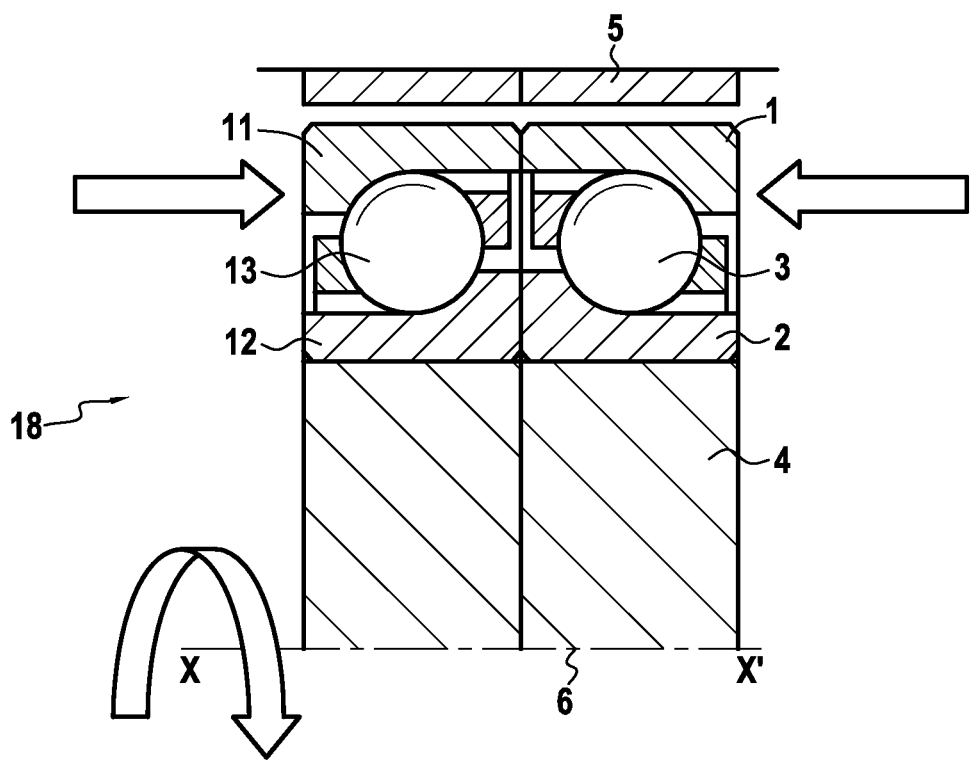
FIG. 6 is an axial half-section view of an auxiliary bearing of the ball bearing type according to the prior art, wherein the auxiliary bearing comprises two juxtaposed ball bearings.

In the embodiment of FIG. 3, a radial spring washer 144A is inserted between the rotor cage 102 and the rotor member 104. Similarly a radial spring washer 144B is inserted between the rotor cage 112 and the rotor member 104. The radial spring washers 144A, 144B are annular wavy radial spring washers which may have the shape of corrugated steel strips 144 as illustrated in FIGS. 4 and 5 before receiving an annular shape. The thickness a of the strip, the pitch p of the corrugations, the height h of the corrugations and the width L of the strip 144 contribute to define the stiffness of the spring constituted by such a corrugated strip 144 when it is put in annular shape to constitute a radial spring washer 144A, 144B interposed between a rotor cage 102, 112 and a rotary member 104, 114. The corrugated steel strips 144, which are also named "Borelly springs", may be manufactured and used as described in French patent 2614375.

According to the invention, the radial spring washers 144A, 144B are designed to have a different stiffness around a circumference and also to have different stiffnesses for each of the ball bearings constituting an auxiliary bearing.

In the embodiment illustrated in FIG. 3, radial spring washers are inserted between rotor cages 102, 112 and a rotary member 104, 114, whereas a clearance E2 is created between stator cages 101, 111 and a stationary stator member 105, 115. However it is also possible to create a clearance E2 between rotor cages 102, 112 and the rotary member 104, 114 and to interpose the radial spring washers 144A, 144B between stator cages 101, 111 and the stationary member 105, 115.

The embodiment of FIG. 3 may also be combined with the embodiment of FIG. 2, i.e. radial spring washers 144A, 144B may also be inserted between the rotor cages 202, 212 and the rotary member 204, 214 in an embodiment creating an angular misalignment or alternatively radial spring washers 144A, 144B may also be inserted between the stator cages 201, 211 and the stationary stator member 205, 215 in an embodiment creating an angular misalignment if a clearance is created between the rotor cages 202, 212 and the rotary member 204, 214.

The invention enables to increase significantly and in a controlled manner the starting torque of a set of ball bearings assembled in a cartridge used for the purpose of securing the landing of the rotor for a machine levitated on active magnetic bearings. The starting torque will be adjusted to be higher than the aerotorque generated by aerodynamic effects.

It is to be noted that loads applied on the ball bearings set during landing are significantly higher than ball bearing preload which may therefore be qualified as "soft" preload. The features of the present invention thus enable to improve the starting torque of an auxiliary bearing without significantly modifying the ball bearing behavior during landing.

The auxiliary bearing according to the invention may be used for different applications, for example in the automotive industry (with bearings of relatively small size), e.g. for small turbo-compressors or in oil and gas industry (with bearings of a larger size), e.g. for motor compressors.

Although preferred embodiments have been shown and described, it should be understood that any changes and modifications may be made therein without departing from the scope of the invention as defined in the appended claims. Thus the features of the different embodiments may be combined. In particular it is possible to combine a radial misalignment with an angular misalignment.

The invention claimed is:

1. An assembly comprising:
   a rotating shaft supported within a stationary housing by at least one active magnetic bearing associated with an air gap and at least one auxiliary bearing having first and second coaxially arranged annular surfaces,
   wherein one of the first and second coaxially arranged annular surfaces defines a clearance with one of the stationary housing and the rotating shaft,
   wherein the clearance is less than the air gap associated with the at least one active magnetic bearing,
   wherein the other of the first and second coaxially arranged annular surfaces are integral with the other one of the stationary housing and the rotating shaft, and
   wherein the at least one auxiliary bearing includes a first ball bearing and a second ball bearing having a misalignment with respect to each other to provide an offset between an axis of the first ball bearing and an axis of the second ball bearing,
   wherein the misalignment comprises a radial misalignment and an angular misalignment,
   wherein the angular misalignment comprises a geometrical offset between bearing housing seats of the first and second ball bearings created by a rotor angularly offset by first and second rotor members.

2. The assembly according to claim 1, wherein a differential load applied on the first and second ball bearings provides the angular misalignment.

3. The assembly according to claim 1, wherein radial springs having different stiffnesses or different preloading conditions provide the radial misalignment.

4. The assembly according to claim 1, wherein a non-uniform circumferential axial preload on the first and second ball bearings provides the angular misalignment.

5. The assembly according to claim 1, wherein first and a first and second annular wavy radial spring washers, respectively located between the first and second coaxially arranged annular surfaces and the the stationary housing and the rotating shaft, the first annular wavy spring washer having a different stiffness from the second annular wavy spring washer to provide the geometrical offset.

6. The assembly according to claim 5, wherein the first and second annular wavy spring washers each have different stiffnesses around circumferences of the respective first and second ball bearings.

7. The assembly according to claim 1, wherein the air gap associated with the at least one active magnetic bearing is between 0.2 and 0.5 mm and the clearance is between 0.15 and 0.3 mm.

8. A radial magnetic bearing device, comprising:
   an assembly providing a rotating shaft supported within a stationary housing by at least one active magnetic bearing associated with an air gap and at least one auxiliary bearing having first and second coaxially arranged annular surfaces,
   wherein one of the first and second coaxially arranged annular surfaces defines a clearance with one of the stationary housing and the rotating shaft,
   wherein the clearance is less than the air gap associated with the at least one active magnetic bearing,
   wherein the other of the first and second coaxially arranged annular surfaces are integral with the other one of the stationary housing and the rotating shaft, and
   wherein the at least one auxiliary bearing includes a first ball bearing and a second ball bearing having a misalignment with respect to each other to provide an offset between an axis of the first ball bearing and an axis of the second ball bearing,
   wherein the misalignment comprises a radial misalignment and an angular misalignment,
   wherein the angular misalignment comprises a geometrical offset between bearing housing seats of the first and second ball bearings created by a rotor angularly offset by first and second rotor members.

* * * * *